United States Patent
Koenen (10) Patent No.: US 6,904,534 B2
(45) Date of Patent: Jun. 7, 2005

(54) PROGRESSIVE CPU SLEEP STATE DUTY CYCLE TO LIMIT PEAK POWER OF MULTIPLE COMPUTERS ON SHARED POWER DISTRIBUTION UNIT

(75) Inventor: David J. Koenen, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 09/968,416

(22) Filed: Sep. 29, 2001

(65) Prior Publication Data

US 2003/0065961 A1 Apr. 3, 2003

(51) Int. Cl.[7] .............................................. G06F 1/32
(52) U.S. Cl. .................. 713/323; 713/300; 713/310; 713/320; 713/322; 713/340
(58) Field of Search .............................. 713/300, 310, 713/320, 322, 323, 340, 324

(56) References Cited

U.S. PATENT DOCUMENTS

| | | | | |
|---|---|---|---|---|
| 4,090,088 A | * | 5/1978 | McMahon et al. | 307/38 |
| 4,245,319 A | * | 1/1981 | Hedges | 700/296 |
| 5,541,589 A | * | 7/1996 | Delaney | 340/870.02 |
| 5,724,591 A | * | 3/1998 | Hara et al. | 713/322 |
| 6,182,232 B1 | * | 1/2001 | Klein | 713/340 |
| 6,272,642 B2 | * | 8/2001 | Pole et al. | 713/300 |
| 6,564,332 B1 | * | 5/2003 | Nguyen et al. | 713/340 |
| 6,574,740 B1 | * | 6/2003 | Odaohhara et al. | 713/323 |
| 2001/0007463 A1 | * | 7/2001 | Hayashi et al. | 347/86 |
| 2002/0062454 A1 | * | 5/2002 | Fung | 713/300 |
| 2003/0023885 A1 | * | 1/2003 | Potter et al. | 713/300 |
| 2003/0055969 A1 | * | 3/2003 | Begun et al. | 709/226 |
| 2003/0065958 A1 | * | 4/2003 | Hansen et al. | 713/300 |

OTHER PUBLICATIONS

*Pentium® III Processor with 512KB L2 Cache at 1.13GHz*, Intel Corporation (datasheet), Order No.: 249657–001, pp. 1–2 and 12–15 (Jun. 2001).

* cited by examiner

Primary Examiner—Lynne H. Browne
Assistant Examiner—Nitin C. Patel (57) ABSTRACT

A method and apparatus for distributing power to a plurality of computers in a network. A power management system including a feed-back mechanism, is employed to monitor power consumptions of the plurality of computers. Should the overall power consumption reach a threshold, the power management system instructs the microprocessors in the plurality of computers to enter into a lower power state, such as a sleep state, for a certain duration, thus lowering overall power.

23 Claims, 6 Drawing Sheets

PROGRESSIVE CPU SLEEP STATE DUTY CYCLE TO LIMIT PEAK POWER OF MULTIPLE COMPUTERS ON SHARED POWER DISTRIBUTION UNIT

CROSS-REFERENCE TO RELATED APPLICATIONS

None.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to power management of a computer system and, more particularly, utilizing a power distribution unit to control the amount of power consumed by a network of computers.

2. Description of the Related Art

As computers get smaller, the computer's power density per unit of volume increases. That is, while the computer's size may decrease, the power demand of the computer generally remains the same. In some applications, a plurality of computer servers in a network are mounted onto a rack. The servers and other electronic components on the rack are fed by a common power source.

Generally, power management of the servers on the rack is performed in a somewhat inefficient and expensive manner. In calculating the power demands, first, the maximum power rating of individual servers is determined. Next, the amount of power required for each of the racks containing the servers is calculated. Last, a power source provides enough current for the maximum or peak current rating for all the components, including the servers, disk drives, cooling fans, etc., in the entire rack. This method ensures that if all components were operating at their peak power at the same time, the system would not overload the wirings or circuit breakers.

For safety reasons, building facility engineers design for worst case scenarios. For example, in an Internet Service Providers (ISP) or Application Service Providers (ASP) environment, the servers are seldom operating at their peak, and if so, rarely at the same time. Therefore, while the above described system may be reliable, such a system is inefficient and expensive for certain applications.

BRIEF SUMMARY OF THE INVENTION

Briefly, a power management system for distributing power to a plurality of computers is employed. In one embodiment, the power management system monitors the power consumption of the various computers and regulates the overall power demand by momentarily putting microprocessors of the computers into a lower power state. As the overall power demand exceeds a preset limit, the power management system applies a variable increasing power down duty cycle to the microprocessors whereby the overall power demand of the computers decreases to an acceptable level.

DETAILED DESCRIPTION OF THE INVENTION

Figure 1:
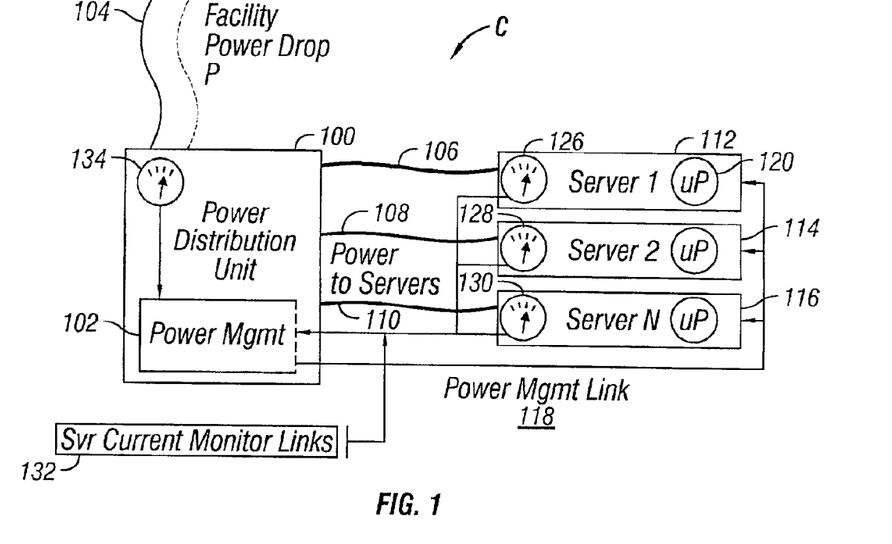
FIG. 1 is a block diagram of a computer system in accordance with the present invention.

FIG. 1 is a block diagram of an embodiment of a computer system C in accordance with the present invention. The computer system C typically includes various computing devices, such as servers 112, 114 and 116. For illustrative purposes, three (3) servers are shown in FIG. 1. However, one skilled in the art would recognize that there could be more than three (3) servers in a system powered by a common power source. Each server generally includes a microprocessor and a current monitoring device. For example, the server 112 includes a microprocessor 120 and a current monitoring device 126. The microprocessor 120 can be any type of general central processing unit (CPU), such as an Intel Pentium-type microprocessor. The servers 112, 114 and 116 are powered by a power distribution unit 100. Power P from a facility power drop is provided to the power distribution unit 100 via power lines 104.

In this embodiment, the power distribution unit 100 includes a power management controller 102 and a current monitoring device 134. The power management controller 102 includes the necessary hardware and software for ascertaining power demands of various servers coupled to it, and power P supplied from the facility power drop. The power P from the power distribution unit 100 is provided to the servers 112, 114 and 116 via power lines 106, 108 and 110, respectively.

The current measuring devices 126, 128 and 130, measure local current demand for their respective servers. Power P provided by the facility power drop to the power distribution unit 130 is monitored by the current measuring device 134.

The power data management controller 102 receives current demand information of the servers 112, 114 and 116 via a line 132. The power management controller 102 is also coupled to the microprocessors of the microprocessors of the various servers via a data bus 118. The data bus 118 can carry microprocessor commands; such as state requests. Although not shown, state requests can be encoded in-band over power lines 106, 108 and 110 and interpreted by the server's microprocessor before its power filtering circuit. Thus, a separate data bus line 118 would not be needed.

Generally, the total power consumed by a server is directly related to the utilization of its microprocessor. Normally, there is a base power level required to power the servers, fans and drives, such as a floppy drive or a CD-ROM drive. For microprocessors that include CMOS logic, power consumption of the microprocessor increases proportionally as the processor's logical state transitions increase. Thus, a microprocessor with fewer state transactions, translates to less power demand. The server's memory, disk and interface ports are also directly related to the microprocessor's activity. For example, a request may come over an Ethernet network. This request generates microprocessor activity, memory activity and possibly disk drive activity. Thus, power demand of the server increases during these requests. Slowing down the microprocessor may slow down the frequency of memory and I/O requests. Generally, the maximum power for a server is reached only when all the electronic devices in the computer are operating at their peak and for the rack when all components in the rack are operating at their peak.

The power distribution unit, described above, can be coupled to any type of electronic components. In addition, the power management controller could be located outside of the power distribution unit or be in many locations and networked together.

Figure 2:
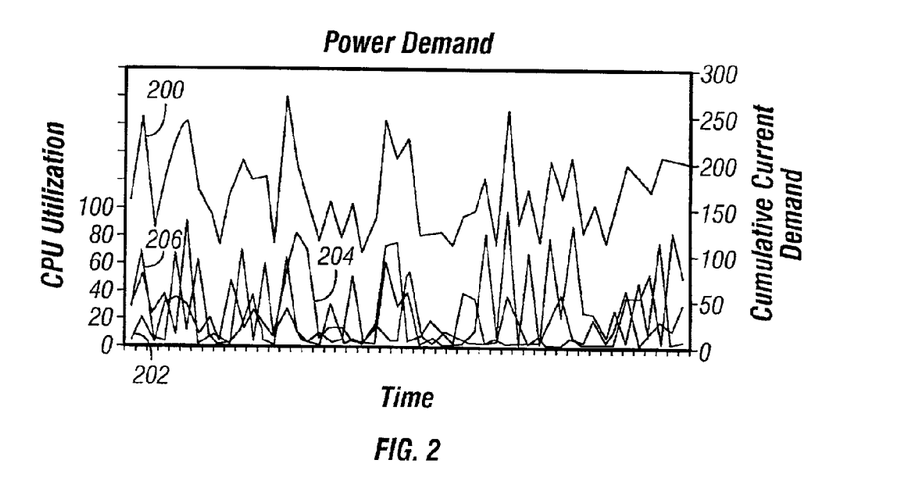
FIG. 2 is a chart illustrating the power demands of a plurality of computers.

FIG. 2 is a chart illustrating the power demands of a plurality of computer servers. As mentioned previously, a microprocessor's utilization is directly related to the microprocessor's current demand. For example, in the computer system C with three (3) servers coupled to a shared power source, lines 202, 204 and 206 represent microprocessor utilization and current demands for respective servers 112, 114 and 116. The figure shows over time varying current demands of the three servers. Line 200 represents the cumulative current demands of servers 112, 114 and 116. Typically, in certain applications, such as ISP or ASP, the microprocessor's utilization for the servers is usually less than 25% on average.

Since the server's total power is typically related to the microprocessor activity, the power demand requirement for each server can be reduced by regulating the microprocessor's activity. The microprocessor's power demand can be regulated by temporarily putting the microprocessor into a lower power state, such as a sleep state for a short period of time.

Figure 3:
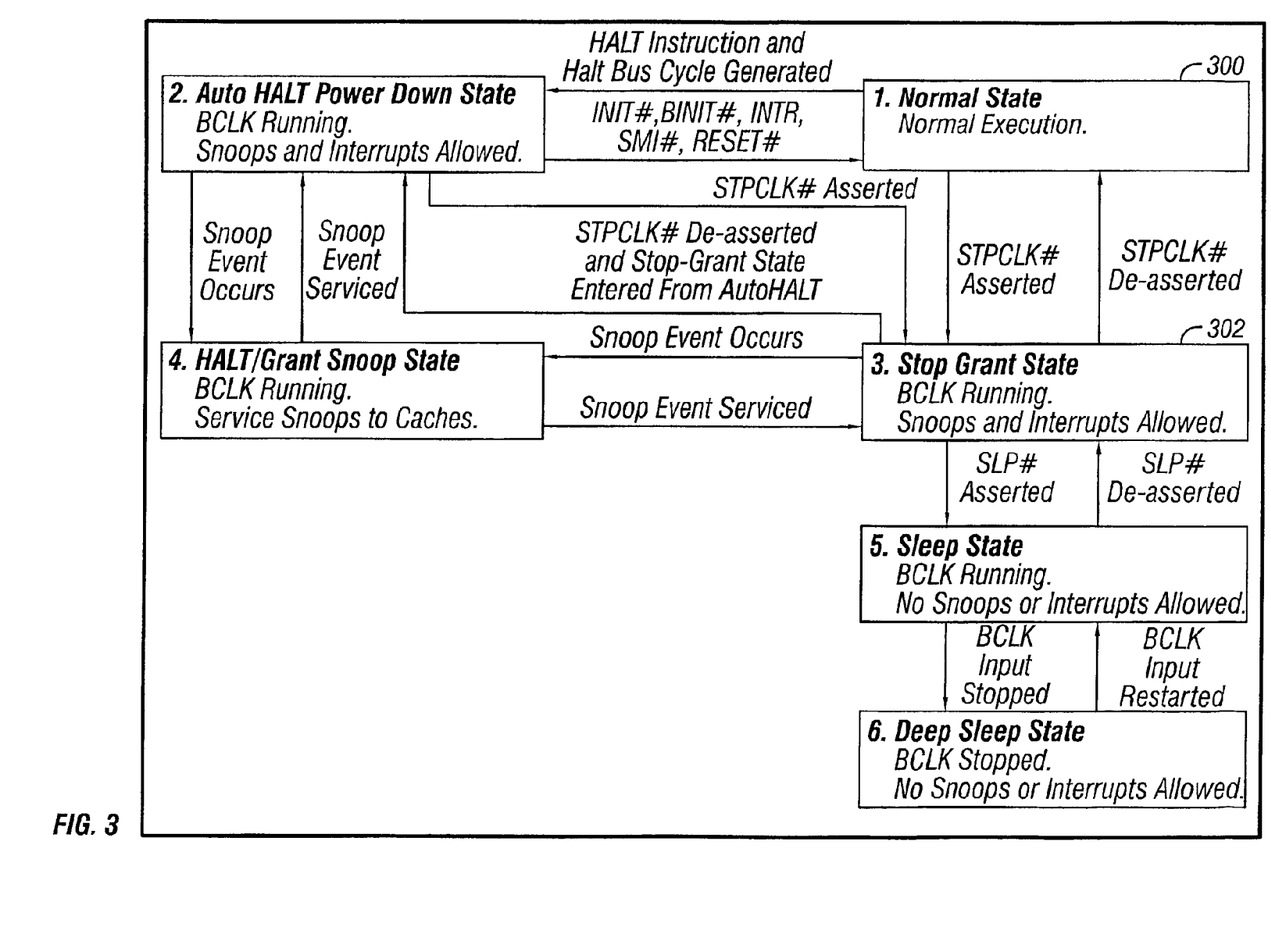
FIG. 3 is a state table illustrating the sleep states of a microprocessor.

FIG. 3 is a state table illustrating the lower power sleep states of an Intel Pentium III microprocessor. The sleep states of the Intel Pentium III microprocessor are described in Intel's Pentium III Processor with 512 KB L2 Cache at 113 GHz Datasheet, June, 2001 (herein incorporated in its entirety, by reference). Typically, when the microprocessor is operating, the microprocessor is in a normal state 300. When a STPCLK# signal is asserted, the microprocessor enters into a sleep state, such as a stop grant state 302. When the microprocessor is in the stop grant state 302, the microprocessor requires less power. When the microprocessor does not receive the STPCLK# signal, the microprocessor is in the normal state 300.

When the microprocessor is in the stop grant state 302, the bus clock (BCLK) continues to run. Snoops and interrupts are also allowed in the stop grant state 302. Thus, the microprocessor can operate in a lower power state, yet can respond to snoops and interrupts. Although, the Intel Pentium processor has even deeper sleep states, these deeper sleep states do not allow snoops or interrupts. Therefore, when placing a microprocessor in a lower power state, this lower power state should preferably be able to respond to snoops and interrupts. Snoops and interrupts are typically generated by asynchronous external events like keyboard, Ethernet network or disk drive responses.

Other techniques may be employed to momentarily reduce power consumption of a computer. Such techniques may not necessarily involve microprocessor commands.

Figure 4:
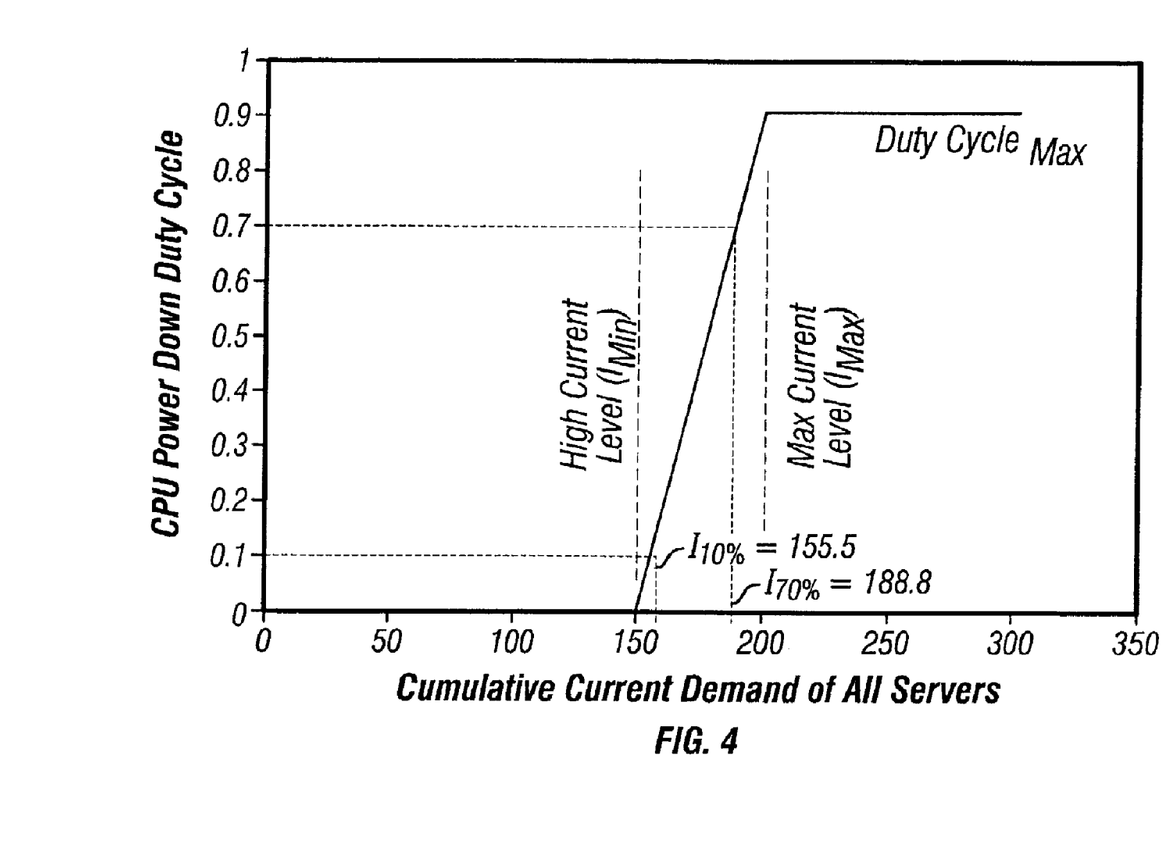
FIG. 4 is a graph illustrating the cumulative current demand of the computer systems versus the microprocessor power down duty cycle.

FIG. 4 is a graph illustrating the cumulative current demand of the servers versus the microprocessor's power down duty cycle. The microprocessor power down duty cycle is a ratio of the time the microprocessor is in a sleep state versus the time the microprocessor is in the normal state. Thus, for example, if the microprocessor power down duty cycle is 10%, the microprocessor is in a sleep state 10% of a period of time. Generally, placing the microprocessor momentarily in a lower power state will not adversely affect the performance of the microprocessor. In certain applications, it is rare to have all the servers operating at their peak at any instant in time. Thus, a power down period may likely occur during an idle microprocessor period and should have little effect on overall performance.

FIG. 4 also includes a current minimum $I_{MIN}$ and a current maximum $I_{MAX}$. When the current demand for the cumulative servers is below $I_{MIN}$, the microprocessors power down duty cycle is 0%. Thus, the microprocessors can operate in their normal state. Once the cumulative current demand for the servers exceeds $I_{MIN}$, the microprocessor's power down duty cycle is greater than 0%. FIG. 4 illustrates a linear increasing power down duty cycle, however one skilled in the art to recognize that the increasing duty cycle may be any variable function in time. When the cumulative current demand for the servers exceeds $I_{MAX}$, the microprocessor's power down duty cycle approaches a power down duty cycle maximum. For example, the Duty Cycle$_{MAX}$ is 90% should the cumulative current demand for all of the servers exceed $I_{MAX}$.

Figure 5A:
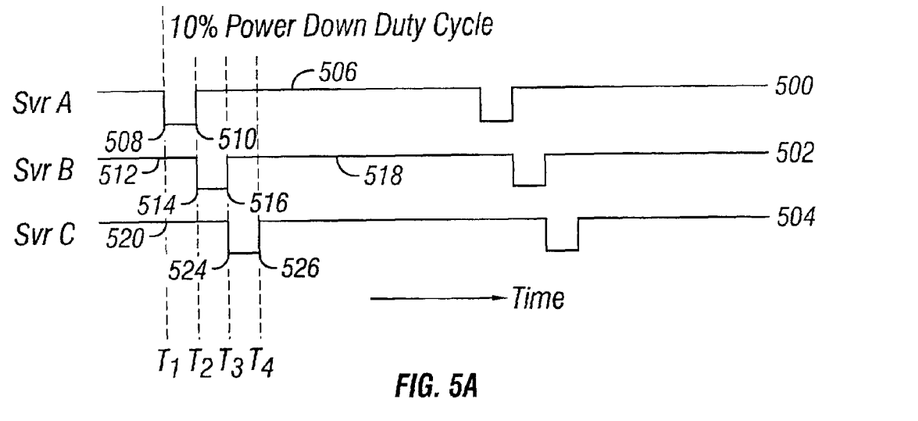
FIG. 5A is a timing diagram of a power down duty cycle of 10%.
Figure 5B:
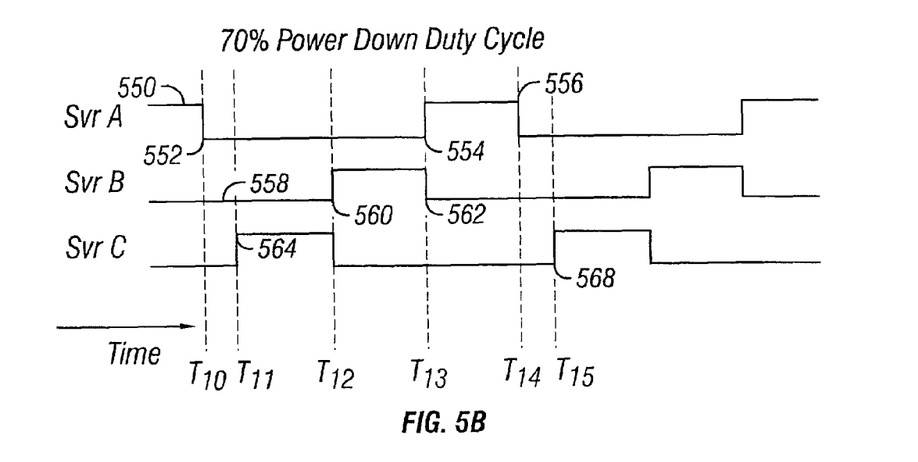
FIG. 5B is a timing diagram of a power down duty cycle of 70%.

FIGS. 5A and 5B are timing diagrams of a power down duty cycle of 10% and 70%. A STPCLK# signal is asserted in a low logical state (# sign) and not asserted in a high logical state. In FIG. 5A, the power down duty cycle for each server is shown. For example, the power down duty cycle over time for server A is represented by line 500. If the cumulative current demand for all of the servers is 155.5 amps ($I_{10\%}$), the Server A microprocessor's power down duty cycle is 10%. (See FIG. 4). Therefore, with a 10% power down duty cycle, the power management controller 102 would send a STPCLK# signal to the microprocessor 112 for a duration of 10% of a time period. The timing diagram of FIG. 5A shows that a STPCLK# is asserted 508 at $T_1$ and deasserted 510 at $T_2$. During the time when the STPCLK# is asserted at $T_1$, the power management controller 102 does not apply a STPCLK# signal to either server B or C, as shown by 512 and 520.

After the STPCLK# signal is deasserted 510 at $T_2$, the power management controller 102 sends the STPCLK# signal to server B, as shown at 514. At this same time $T_2$, the STPCLK# signal is not sent to the microprocessor 124 of server C. Therefore, at any one time, only one of the server's microprocessor is in a sleep state, when the power down duty cycle is 10%.

Next, if the cumulative current demand for all of the servers is 188.8 amps ($I_{70\%}$), a 70% power down duty cycle is generally applied to the servers (see FIG. 4). FIG. 5B is a timing diagram of a power down duty cycle of 70%. A STPCLK# signal is asserted by the power control unit 102 to the various microprocessors in a staggered state. For example, for Server A, the STPCLK# signal is asserted 552 at $T_{10}$ and deasserted 544 at $T_{13}$. The time between $T_{10}$ and $T_{13}$ represents a power down duty cycle of 70%. During this time, Server B is also in the stop grant state 558. The STPCLK# signal is deasserted 560 for Server B at $T_{12}$ and once again is asserted 562 at $T_{12}$.

Should the cumulative current demands for all of the servers approach $I_{MAX}$, a power down duty cycle maximum Duty Cycle$_{MAX}$ is applied to the servers. In one embodiment, the Duty Cycle$_{MAX}$ is a 90% power down duty cycle. The maximum power down duty cycle should be around 90% to prevent starvation of microprocessor time and allow it to run critical server and O/S operations. The power down cycling to each server is also staggered to prevent a power surge when the microprocessor comes out of its sleep state. When the microprocessor is in its sleep or lower power state, all other server activity generally decreases as well. This decrease in bus, memory, disk, network and other I/O references typically decreases the total power consumed by the individual server. After some time lag, due to the power circuit capacitance, the server's current demand for each server will typically decrease. The I$_{MAX}$ must be high enough to allow the servers to perform at some adequate performance level, while low enough to provide power savings. Empirical data set can be ascertained from the servers to provide the system designer with adequate matrics to set the high current level mark. Thus, particular threshold values can be determined based on the specific application so as to minimize performance degradation yet maximize power savings. These threshold values can then be programmed into the power management controller 102.

Figure 6:
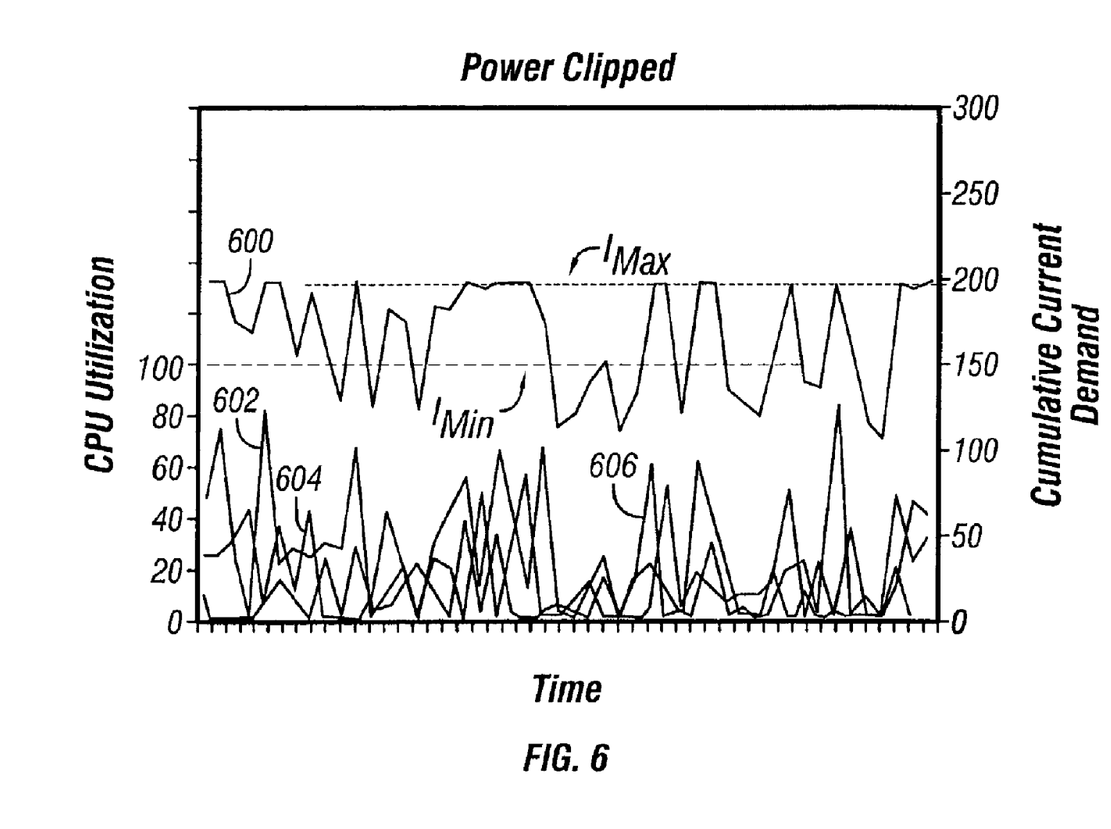
FIG. 6 is a graph illustrating the microprocessor utilization and cumulative power with a down duty cycle applied.

FIG. 6 is a graph illustrating the microprocessor's utilization and cumulative power demand with a down power duty cycle is applied. Lines 602, 604 and 606 represents the current demands for Servers A, B and C. Line 600 is the cumulative current demands for Server A, Server B and Server C. As shown in the figure, there are times when the cumulative current demand 600 may exceed I$_{MAX}$. That is, during the periods when the multiple servers are operating at their peak, the microprocessor's applications may experience a small slow down time and perhaps some performance degradation. For example, if I$_{MAX}$ is 200 amps, the total current draw of the three (3) servers is limited to this maximum current. Consequently, as shown in FIG. 5, a cumulative current demand is clipped at 200 amps, thus a down duty cycle time of 90% is applied. Server performance may be affected, however, the performance degradation may be small. This small downtime and possible performance degradation is outweighed by the lower current requirement. A lower current requirement thus translates into lower cooling requirements for the computer and a lower maximum current rating.

Figure 7:
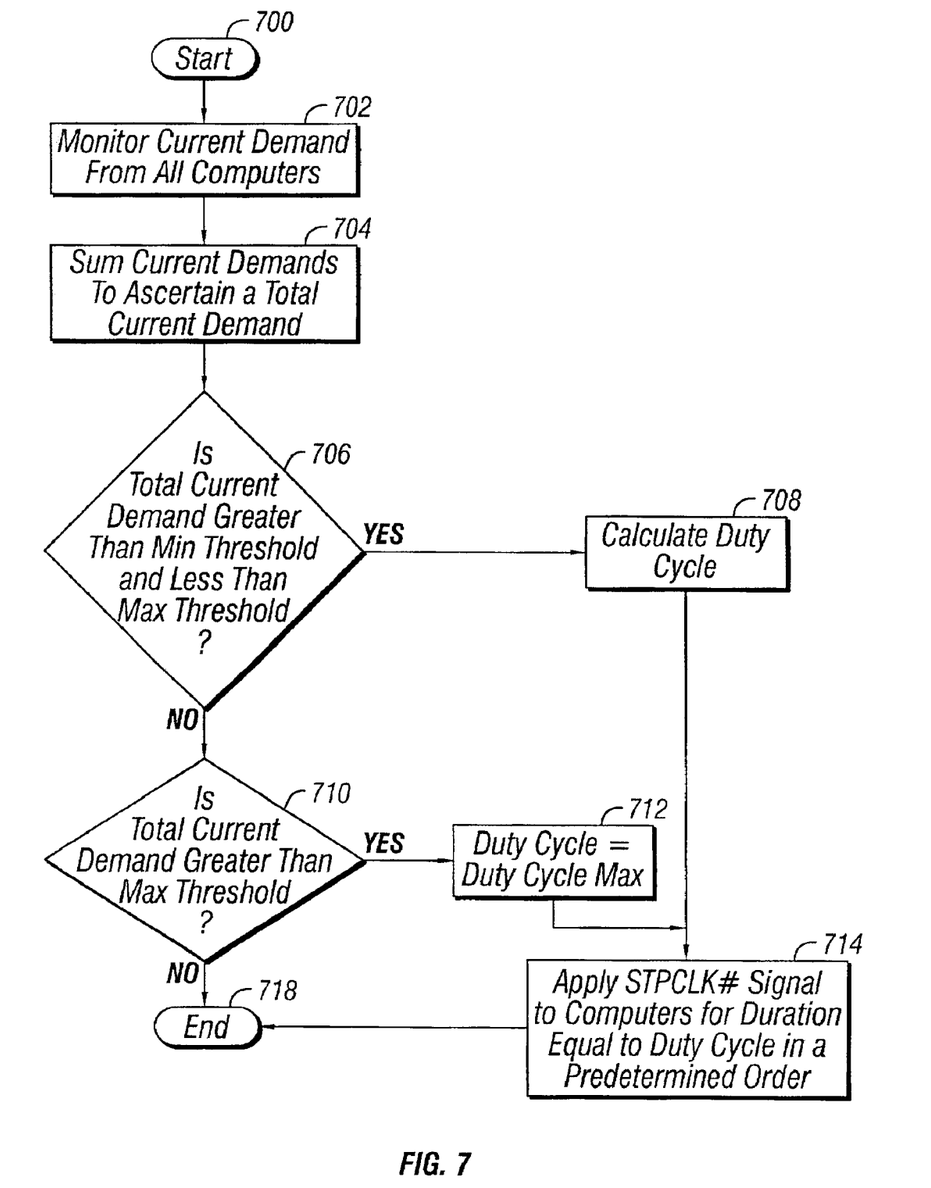
FIG. 7 is a flow diagram illustrating the steps taken according to the present invention of momentarily placing the various microprocessors in a sleep state.

FIG. 7 is a flow diagram illustrating the steps taken according to an embodiment of the present invention. The method starts at step 700. At step 702, the power management controller monitors current demands for all computers. The current demands for each computer is summed to ascertain a total current demand at step 704. At step 706, the total current demand is greater than the minimum threshold but less than the maximum threshold, a duty cycle is calculated at step 708. If the total current demand is not greater than the minimum threshold and not less than the maximum threshold, the method proceeds to step 710. At step 710, if the total current demand is greater than the maximum threshold, the duty cycle equals a Duty Cycle $_{MAX}$ if at step 710, the total current demand is not greater than the maximum threshold the method ends at step 718. At step 714, a STPCLK# is applied to a plurality of computers for a duration equal to the duty cycle calculated in step 708 and step 712, in a predetermined order. After the step 714 is executed, the method ends at step 718.

As indicated above, other techniques may be used to lower power consumption of a plurality of computers without departing from the spirit of the invention. These other techniques may not necessarily involve microprocessor commands.

The foregoing disclosure, a description on the invention are illustrative and explanatory thereof, and various changes in the size, shape, materials, components, circuit elements, wiring connections and context, as well as in the detail of the illustrated diagram and construction and method of operation may be made without departing from the spirit of the invention.

What is claimed is:

1. A computer system, comprising:

a power management system; and a plurality of computers, including a plurality of microprocessors, the plurality of computers coupled to the power management system;

the power management system to monitor a plurality of current demands of the computers, and the power management system to instruct the plurality of microprocessors to enter into a certain lower power state for a certain duration responsive to changing current demands of the plurality of computers, wherein the certain duration is a power down duty cycle.

2. The computer system of claim 1, wherein the microprocessor is a Pentium-type processor.

3. The computer system of claim 2, wherein the lower power state is a sleep state.

4. The computer system of claim 3, wherein the plurality of microprocessors can respond to snoops and interrupts in the sleep state.

5. The computer system of claim 3, wherein the sleep state is a stop-grant state.

6. The computer system of claim 1, wherein the power management system instructs the plurality of microprocessors to enter into a certain lower power state for certain duration by a command encoded in power lines from the power management system to the plurality of computers.

7. The computer system of claim 1, wherein the power management system instructs the plurality of microprocessors to enter into a certain lower power state for certain duration by a command over a data link.

8. The computer system of claim 1, wherein the power management system is not included in one of the plurality of computers.

9. The computer system of claim 1, wherein the power management system is included in one of the plurality of computers.

10. The computer system of claim 1, wherein the changing current demands is a cumulative current demand of the plurality of computers.

11. A computer system, comprising:

a power management system; and a plurality of computers, including a plurality of microprocessors, the plurality of computers coupled to the power management system;

the power management system to monitor a plurality of current demands of the computers, and the power management system to instruct the plurality of microprocessors to enter into a certain lower power state for a certain duration responsive to changing current demands of the plurality of computers, wherein the plurality of computers include a plurality of monitors for measuring the plurality of current demands.

12. A method for providing power to a plurality of computers, comprising the steps of:

measuring current demands for the plurality of computers;

calculating a total current demand; and placing each computer in a lower power state for a selected percentage of time in response to the total current demand exceeding a threshold, wherein the selected percentage of time varies according to a predefined relationship with respect to the total current demand.

13. The method of claim 12, wherein the plurality of computers include Pentium-type microprocessors.

14. The method of claim 12, wherein the lower power state is a sleep state.

15. The method of claim 14, further comprising the step of responding to snoops and interrupts while each computer is in the sleep state.

16. The method of claim 15, wherein the sleep state is a stop-grant state.

17. The method of claim 12, wherein the predefined relationship is a linear relationship between the selected percentage of time and the total current demand over a range of the total current demand.

18. A method for providing power to a plurality of computers, comprising the steps of:

measuring current demands for the plurality of computers;

calculating a total current demand; and placing each computer in a lower power state for a certain time should the total current demand exceed a threshold, wherein placing each computer in a sleep state includes asserting a STPCLK signal.

19. A method for providing power to a plurality of computers, comprising the steps of:

measuring current demands for the plurality of computers;

calculating a total current demand; and placing each computer in a lower power state for a certain time should the total current demand exceed a threshold, wherein the certain time is a power down duty cycle.

20. The method of claim 19, wherein the power down duty cycle is less than 90%.

21. A method of managing power in a system having plural computers, comprising:

measuring, with current monitors in respective plural computers, a local current demand of each computer;

calculating a total current demand based on the measured local current demands of the computers; and placing each computer into a lower power state for a selected time period in response to detecting that the total current demand exceeds a threshold.

22. A system comprising:

a power management controller; and a plurality of computers coupled to the power management controller, the power management controller to receive measured local current demands from the computers and to calculate a total current demand based on the measured local current demands, the power management controller to further place each computer in a lower power state for a selected percentage of time in response to the total current demand exceeding a threshold, wherein the selected percentage of time varies according to a predefined relationship with respect to the total current demand.

23. The system of claim 22, wherein the predefined relationship is a linear relationship between the selected percentage of time and the total current demand over a range of the total current demand.

* * * * *